United States Patent [19]

Kunz

[11] 4,373,596
[45] Feb. 15, 1983

[54] WEIGHING APPARATUS WITH ELECTROMAGNETIC FORCE COMPENSATION

[76] Inventor: Peter Kunz, Saumstrasse 28, CH-8625 Gossau, Switzerland

[21] Appl. No.: 292,904

[22] Filed: Aug. 14, 1981

[30] Foreign Application Priority Data

Aug. 22, 1980 [CH] Switzerland .................. 6339/80

[51] Int. Cl.³ .............................................. G01G 7/00
[52] U.S. Cl. .............................. 177/212; 177/210 EM
[58] Field of Search .......... 177/212, 210 EM, DIG. 5

[56] References Cited

U.S. PATENT DOCUMENTS 3,688,854  9/1972  Strobel .......................... 177/212 X
3,786,883  1/1974  Kunz ............................. 177/212 X
4,337,838  7/1982  Kunz ............................. 177/212

Primary Examiner—Joseph W. Hartary
Attorney, Agent, or Firm—Laubscher, Philpitt & Laubscher

[57] ABSTRACT

A weighing apparatus with electromagnetic force compensation is disclosed, including a load portion having a first compensation or load coil, and a reference portion having a second compensation or reference coil. An associated permanent magnet system is provided in the form of a partially closed housing having an intermediate wall on which flat permanent magnets are mounted, preferably in pairs. The load coil and the reference coil are arranged on opposite sides of the intermediate wall, thereby providing a compact arrangement which is easy to assemble and which has particular properties in regard to mutual decoupling of the two compensation coils.

7 Claims, 4 Drawing Figures

WEIGHING APPARATUS WITH ELECTROMAGNETIC FORCE COMPENSATION

BRIEF DESCRIPTION OF THE PRIOR ART

This invention relates to balances with electromagnetic force compensation.

A known type of weighing system with electromagnetic force compensation comprises a load portion having a load coil, a reference portion having a reference coil, a permanent magnet system having an air gap in which the load and the reference coils are arranged one beside the other and movable independently of each other, a position detecting circuit and a control circuit for each of the load and reference portions, and an evaluation and display circuit for the weight of material to be weighed, which weight acts on the load portion. Weighing systems of this general type are disclosed in the prior patents to Strobel U.S. Pat. No. 3,688,854 and Kunz U.S. Pat. No. 3,786,883 (both assigned to the same assignee as the instant invention).

Balances with electromagnetic force compensation operate, as is known, in the following manner. A coil which passes movably into an air gap in the magnetic field of a permanent magnet system is connected directly or indirectly to a weighing pan or load receiving means. Current flowing through the coil produces a force perpendicularly to the path of the magnetic field in an air gap, in accordance with known laws. A control circuit determines the value of the current flowing through the coil in such a way that under equilibrium conditions the resulting electromagnetic force acting on the load receiving means is equal and opposite to the total load (material to be weighed plus any dead load of the load receiving means). In this condition, the coil current in proportional to the load to a good degree of approximation, and can be evaluated for displaying the weight.

However, as mentioned above, the dependency of the current on the load is only approximate. It is subjected to interference influences which can have an unacceptably noticeable effect, in particular in the form of non-linearity phenomena and variations in sensitivity, when the requirements in respect of weighing accuracy are set at higher levels.

A serious source of such interference influences is based on the following phenomenon: the compensation current flowing through the coil builds up its own current-proportional magnetic field, which is superimposed on the permanent magnetic field. Under ideal conditions, in particular with regard to the position of the coil in the air gap, the force components of the superimposed magnetic fields can cancel each other. However, such ideal conditions generally do not occur. Deliberate and unintentional movements of the coil, even only small movements, have the result that force components remain from the magnetic field produced by the coil. These residual force components make themselves felt, depending on their direction, in an increased or a reduced coil current, and thus ultimately make themselves felt in falsifying the weight display.

The above-described interference influences have a particularly troublesome effect in balances of the general type set forth above, in which there are two coils disposed in a common air gap, that is to say, closely adjacent to each other. In this case, the above-described effects not only result from the respective current of each coil but they are also influenced by the magnitude of the current through the respective other coil. Added to this is the fact that the leakage field increases with the width of the air gap and thus the homogeneity of the permanent magnetic field decreases, which also influences the interference effects.

The present invention was developed to avoid the above and other drawbacks of the known weighing systems.

SUMMARY OF THE INVENTION

Accordingly, a primary object of the present invention is to provide an improved weighing system including a load portion having a load coil, a reference portion having a reference coil, a permanent magnet system containing an air gap in which the load and reference coils are mounted for independent adjacent movement, position detecting means for determining the displacements of the load and reference coils from their initial positions, respectively, control means responsive to signals provided by said position detecting means for supplying compensation current to said load and reference coils to return the same to their intial positions, respectively, and evaluation and display means for indicating the weight of the load acting on the load portion, characterized in that the permanent magnet system comprises a partially closed housing which encloses the air gap and is composed of two substantially identical portions (for example, U-shaped or L-shaped portions). An intermediate member is provided that subdivides the chamber in the housing to form two parital air gaps, and at least one flat permanent magnet is secured to the intermediate member so that said two coils, which are in the form of flat coils, are arranged on opposite sides of the permanent magnet means, the magnetic flux through the lower portions of the coils being opposite to that through the upper portions of the coils.

According to an important advantage of the invention, yoke members may be used in the permanent magnet system which are of identical configurations and may be easily produced. In addition, one and the same size of permanent magnet can be used for different types of balances, and the respective value of the magnetic force required can be attained by the use of an appropriate number of permament magnets.

Various embodiments of the present invention were designed with the intention of reducing the above-mentioned interference effects, that is to say, in particular, to improve linearity and to achieve an improved degree of constancy of sensitivity, while at the same time providing a particularly compact configuration for the permanent magnet system, which is suitable for rational production. The structure of the permanent magnet system provides for decoupling of the two coils, and this provides a significant reduction in the above-described mutual interference influences. This arrangement also gives a permanent magnet system which is very compact and which can be produced economically.

Preferably, the intermediate member is formed of a non-magnetic material, thereby eliminating undesirable magnetic shunts.

Preferably, there are provided at least two of said permanent magnets which are of identical configuration and which are arranged one below the other. In this arrangement, with respect to the same partial air gap, the permanent magnet associated with the upper coil portions and the permanent magnet associated with the lower coil portions are of opposite polarities, thereby affording the advantage of greater simplicity of manufacture, in regard to magnetizing the permanent magnets.

A preferred embodiment which is particularly good from the assembly and installation point of view is one in which there are two pairs of permanent magnets which are mounted in self-retaining relating in recesses in the intermediate member.

In one embodiment of the invention, the housing may be formed by two U-shaped yoke members. As an alternative to this arrangement, the housing may be formed by two L-shaped yoke members. Both these alternative forms are distinguished by rational production of the components, and ease of assembly. In order to cause strengthening of the magnetic field, further permanent magnets may be arranged on walls of the housing.

BRIEF DESCRIPTION OF THE DRAWING

Other objects and advantages of the invention will become apparent from a study of the following specification when viewed in the light of the accompanying drawing, in which.

DETAILED DESCRIPTION

Figure 1:
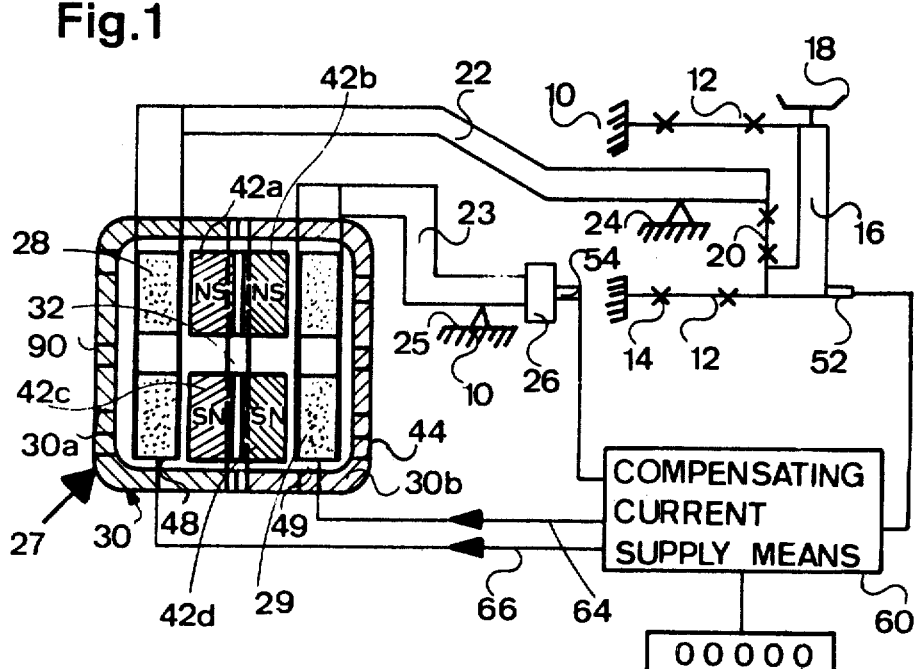
FIG. 1 is a somewhat diagrammatic sectional view of the weighing apparatus of the present invention including U-shaped housing sections.
Figure 2:
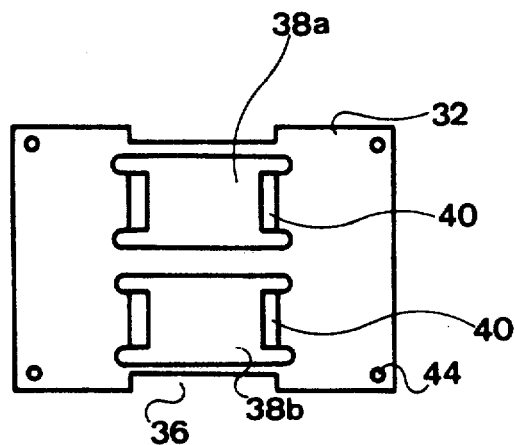
FIG. 2 is an elevational view of the intermediate divider wall of the apparatus of FIG. 1.
Figure 3:
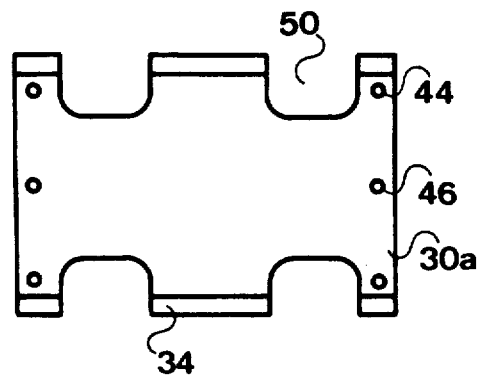
FIG. 3 is an end view of one of the U-shaped housing sections of FIG. 1.

Referring first more particularly to the embodiment of FIGS. 1-3, mounted for parallel movement in a balance frame 10, by means of two links 12 provided with bending mounting means 14, is a load receiving means 16 supporting a weighing pan 18. Pivotally connected thereto by way of a bending coupling means 20 is a double-armed step-up transmission lever 22 which is supported on a pivot mounting 24 in the balance frame 10. Connected with the free end of the lever 22 is a load compensation coil 28.

A second lever 23, mounted on a pivot mounting 25 in the balance frame 10, is connected at one end with a reference compensation coil 29, the other end of the lever 23 carrying a balance weight 26.

A permanent magnet system 27 is provided including a pair of identical U-shaped soft iron yoke members 30a, 30b which together form a hollow housing 30 which is open at opposite ends, the housing 30 being horizontal and parallel with the pivot axes 24 and 25. The housing includes an intermediate divider wall 32 formed of aluminum or brass and held in position by the cooperation between projections 34 (FIG. 3) on the yoke members and recesses 36 (FIG. 2) contained in the partitioning wall 32. As shown in FIG. 2, the partitioning wall contains a pair of vertically arranged openings 38a, 38b with lateral tongue portions forming shoulders 40. Two pairs of square or rectangular flat permanent magnets 42a, 42b, 42c, 42d are fitted into the openings 38a, 38b, respectively, where they are laterally fixed in parallel spaced relation by the shoulders 40. The upper magnets 42a and 42b are magnetized in one horizontal direction, and the lower magnets 42c and 42d are magnetized in the opposite horizontal direction, whereby the magnets of each respective pair are held in position by the mutual attraction force of the permanent magnets. Four holes 44 are provided for screwing the yoke member 30 to the partitioning wall 32 to form the finished permanent magnet system 27, and respective pairs of holes 46 provide for fixing in the balance frame 10 in a manner which is not shown. On each side of the permanent magnets 42 there is a respective partial air gap 48 and 49 in which the load and reference compensation coils 28 and 29, respectively, which are in the form of oval flat coils, are arranged.

Apertures 50 are provided for receiving the connecting elements between the coils 28 and 29 and the load and reference levers, respectively.

A position detector 52, which is indicated only schematically in the drawing, senses the position of the load receiving means 16 (for example photoelectrically) and transmits a load responsive signal to conventional compensation current supply means 60. Similarly, position detector means 54 sends to the compensation current control means a reference responsive signal. As taught by the aforementioned prior patents, the supply means 60 supplies compensation currents to the coils 28 and 29 via conductors 66 and 64, respectively, whereby the weight is determined and displayed on display means 68. The construction and mode of operation of the electrical part of the balance are conventional, so that there is no need to describe them in detail here.

Figure 4:
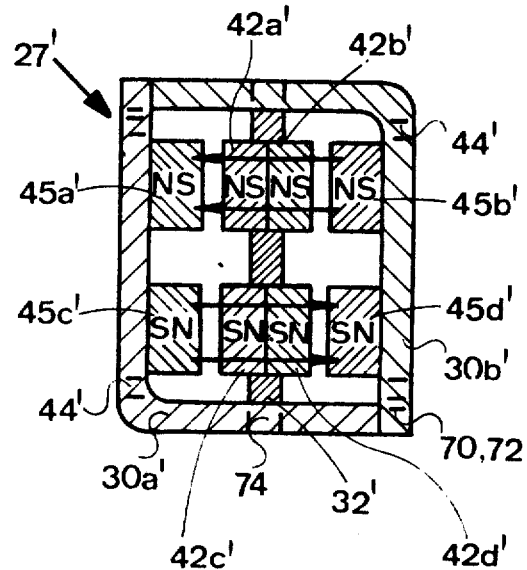
FIG. 4 is a sectional view of another embodiment of the invention including L-shaped housing sections.

In a modified balance having a modified permanent magnet system 27' shown in FIG. 4, the housing of the permanent magnet system 27' is formed by two identical L-shaped soft iron yoke members 30a', 30b' which are connected with each other by projections 70 and recesses 72, similar to the previous embodiment. Mounted in the center by suitable connecting means 74 is a partitioning wall 32' of non-magnetic material, containing a pair of apertures in each of which a respective pair of permanent magnets 42a', 42b' and 42c', 42d' are secured by adhesive, with the magnets of each pair in this embodiment being in contact with each other. Secured by adhesive to the respective walls of the yoke members 30a', 30b' are two further pairs of permanent magnets 45a', 45b' and 45c', 45d' each opposite the respective central pairs of magnets. The arrows show the oppositely directed pattern of the additive horizontal magnetic fields in the upper and lower portions. Holes 44' serve for securing the permanent magnet system 27' to the balance frame and/or additional screwing of the permanent magnet system. Similarly, to the openings 50 in the previous embodiment, this also has openings through which are passed holdings means for the coils 28 and 29 (not shown here).

Preferably, the further magnets 45a', 45b', 45c', 45d' are arranged with their polarities being in flux-additive relation relative to the flux flow path established by the upper and lower permanent magnets 42a', 42b', and 42c', 42d'.

In certain cases, the partitioning wall 32 could instead comprise iron, but in that case it must be magnetically insulated at the top and bottom (at the points of connection to the yoke members) and in the center (between the two pairs of permanent magnets). This somewhat more expensive form of arrangement has the advantage that the air gap in the first embodiment, within a pair of magnets, would be replaced by iron, which is of substantially higher magnetic permeability.

What is claimed is:

1. In a weighing system of the electromagnetic load compensation type including a frame (10), load receiving means (16) movably connected with said frame for vertical displacement from an initial no-load position upon the application of a load thereto, permanent magnet means (27) connected with said frame for producing a stationary magnetic field, load coil means (28) connected with said load-receiving means for vertical displacement in said magnetic field, reference coil means (28) connected with said frame for vertical displacement in said magnetic field from an initial null-position, means (52) for generating a load signal responsive to the displacement of said load-receiving means from its initial no-load position, means (54) for generating a reference signal responsive to the displacement of said reference coil from its null position, compensation current supply means (60) responsive to said load and reference signals for supplying compensating current to said load and reference coils to return the same to their initial no-load and null positions, respectively, and display means (68) responsive to said compensating current for affording a visual indication of the magnitude of the applied load;

the improvement wherein said permanent magnetic means comprises (a) a hollow open-ended horizontally arranged sectional yoke housing including a pair of generally identical soft iron components (30a, 30b);

(b) a vertical divider wall (32) extending longitudinally between the ends of said housing for dividing the chamber contained therein into a pair of air gaps (48, 49); and (c) at least one first permanent magnet (42a) mounted within a first opening (38a) contained in said divider wall, the polar axis of said magnet being normal to said divider wall;

(d) said load and reference coils being arranged in said air gaps on opposite sides of, and parallel with, said divider wall, respectively, whereby the direction of the magnetic flux extending through the lower portions of the coils is opposite to that of the flux extending through the upper portions of the coils.

2. Apparatus as defined in claim 1, wherein said divider wall is formed of non-magnetic material.

3. Apparatus as defined in claim 1, wherein at least one second permanent magnet (42c) is mounted in a second opening (38b) contained in said divider wall beneath said first opening, said first and second magnets being parallel and of opposite polarity.

4. Apparatus as defined in claim 3, wherein a pair of said first permanent magnets (42a, 42b) is mounted in said first divider wall opening, and a pair of said second permanent magnets (42c, 42d) is mounted in said second divider wall opening.

5. Apparatus as defined in claim 1, wherein said yoke housing sections are each of generally U-shaped configuration.

6. Apparatus as defined in claim 1, wherein said yoke housing sections are each of generally L-shaped configuration.

7. Apparatus as defined in claim 3, and further including third permanent magnets (45a', 45c') mounted on the inner wall surfaces of the housing in spaced relation to the pole ends of said first and second magnets, respectively.

* * * * *